US012582024B2

(12) United States Patent
Erker

(10) Patent No.: US 12,582,024 B2
(45) Date of Patent: Mar. 24, 2026

(54) SENSOR DRIFT DETECTION FOR A DOWNFORCE CONTROL SYSTEM OF A SEEDING IMPLEMENT

(71) Applicant: CNH Industrial Canada, Ltd., Saskatoon (CA)

(72) Inventor: Gregory Jacob Erker, Saskatoon (CA)

(73) Assignee: CNH INDUSTRIAL CANADA, LTD., Saskatoon (CA)

( * ) Notice: Subject to any disclaimer, the term of this patent is extended or adjusted under 35 U.S.C. 154(b) by 836 days.

(21) Appl. No.: 17/900,707

(22) Filed: Aug. 31, 2022

(65) Prior Publication Data

US 2024/0065137 A1 Feb. 29, 2024

(51) Int. Cl.
*A01C 7/20* (2006.01)
*A01C 7/10* (2006.01)

(52) U.S. Cl.
CPC .............. *A01C 7/203* (2013.01); *A01C 7/102* (2013.01)

(58) Field of Classification Search
CPC ........... A01C 7/203; A01C 7/201; A01C 7/20; A01C 7/00; A01C 7/102; A01C 7/10; A01C 7/08
See application file for complete search history.

(56) References Cited

U.S. PATENT DOCUMENTS

| | | | |
|---|---|---|---|
| 9,173,339 B2 | 11/2015 | Sauder et al. | |
| 9,481,294 B2 | 11/2016 | Sauder et al. | |
| 10,537,055 B2 | 1/2020 | Gresch et al. | |
| 10,681,854 B2 | 6/2020 | Sauder et al. | |
| 10,827,663 B2 | 11/2020 | Gresch et al. | |
| 11,122,726 B2 | 9/2021 | Bassett | |
| 11,140,812 B2 | 10/2021 | Leimkuehler et al. | |
| 11,206,754 B2 | 12/2021 | Rhodes | |
| 11,310,953 B2 | 4/2022 | Schoeny et al. | |
| 11,337,363 B2 | 5/2022 | Dienst | |
| 2017/0339821 A1 | 11/2017 | Ray et al. | |
| 2019/0110391 A1* | 4/2019 | Gresch ................... | A01C 7/203 |
| 2019/0380259 A1 | 12/2019 | Frank et al. | |
| 2020/0154627 A1 | 5/2020 | Plattner | |

FOREIGN PATENT DOCUMENTS

| | | |
|---|---|---|
| CA | 3007174 A1 | 11/2019 |
| JP | 5293111 B2 | 9/2013 |

OTHER PUBLICATIONS

"20/20 AirForce—Owner's Manual", Precision Planting, accessed Aug. 31, 2022, 62 pages.
"20|20 Gen 3-Home Screen Layout", Quick References Guide, Precision Planting, Sep. 2, 2020, 26 pages.

* cited by examiner

*Primary Examiner* — Christopher J. Novosad
(74) *Attorney, Agent, or Firm* — Fletcher Yoder, P.C.

(57) ABSTRACT

A system for an agricultural seeding implement includes processing circuitry configured to, while the agricultural seeding implement is in a lowered position work state to distribute seeds during each pass through a seeding portion of a field, provide control signals to a downforce actuator to drive one or more row units toward a surface of the field. The processing circuitry is also configured to, while the agricultural seeding implement is in a raised position work state with the one or more row units lifted off of the surface of the field to turn within a headlands portions of the field, perform a calibration check for one or more load cell sensors that are configured to measure a downforce applied by the one or more row units to the field.

20 Claims, 7 Drawing Sheets

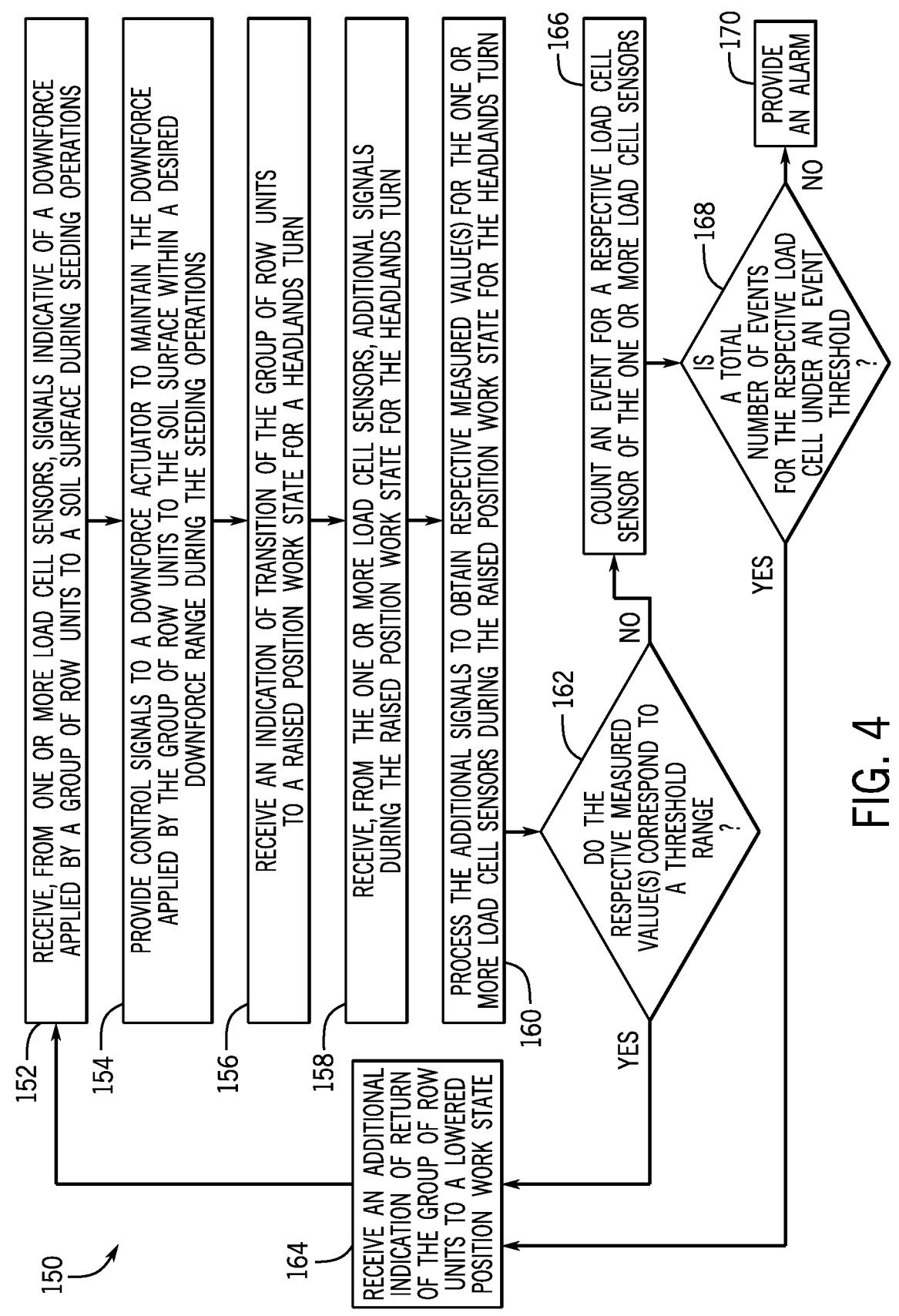

RECEIVE, FROM ONE OR MORE LOAD CELL SENSORS, SIGNALS INDICATIVE OF A DOWNFORCE APPLIED BY A GROUP OF ROW UNITS TO A SOIL SURFACE DURING SEEDING OPERATIONS — 152

PROVIDE CONTROL SIGNALS TO A DOWNFORCE ACTUATOR TO MAINTAIN THE DOWNFORCE APPLIED BY THE GROUP OF ROW UNITS TO THE SOIL SURFACE WITHIN A DESIRED DOWNFORCE RANGE DURING THE SEEDING OPERATIONS — 154

RECEIVE AN INDICATION OF TRANSITION OF THE GROUP OF ROW UNITS TO A RAISED POSITION WORK STATE FOR A HEADLANDS TURN — 156

RECEIVE, FROM THE ONE OR MORE LOAD CELL SENSORS, ADDITIONAL SIGNALS DURING THE RAISED POSITION WORK STATE FOR THE HEADLANDS TURN — 158

PROCESS THE ADDITIONAL SIGNALS TO OBTAIN RESPECTIVE MEASURED VALUE(S) FOR THE ONE OR MORE LOAD CELL SENSORS DURING THE RAISED POSITION WORK STATE FOR THE HEADLANDS TURN — 160

DO THE RESPECTIVE MEASURED VALUE(S) CORRESPOND TO A THRESHOLD RANGE ? — 162

COUNT AN EVENT FOR A RESPECTIVE LOAD CELL SENSOR OF THE ONE OR MORE LOAD CELL SENSORS — 166

IS A TOTAL NUMBER OF EVENTS FOR THE RESPECTIVE LOAD CELL UNDER AN EVENT THRESHOLD ? — 168

PROVIDE AN ALARM — 170

RECEIVE AN ADDITIONAL INDICATION OF RETURN OF THE GROUP OF ROW UNITS TO A LOWERED POSITION WORK STATE — 164

SENSOR DRIFT DETECTION FOR A DOWNFORCE CONTROL SYSTEM OF A SEEDING IMPLEMENT

BACKGROUND

The present disclosure relates generally to a downforce control system for a seeding implement, and more particularly to sensor drift detection for a downforce control system of a seeding implement.

Generally, a seeding implement (e.g., seeder) is towed behind a tractor or other work vehicle via a mounting bracket secured to a rigid frame of the seeding implement. The seeding implement typically includes multiple row units distributed across a width of the seeding implement. Each row unit is configured to deposit seeds at a target depth beneath a soil surface of a field, thereby establishing rows of planted seeds. For example, each row unit typically includes a ground engaging tool (e.g., opener disc) that forms a seeding path (e.g., trench) for seed deposition into the soil. A seed tube (e.g., coupled to the ground engaging tool) is configured to deposit seeds and/or other agricultural products (e.g., fertilizer) into the trench. The ground engaging tool and the seed tube may be followed by at least one wheel, such as a closing wheel that moves displaced soil back into the trench and/or a packer wheel that packs the soil on top of the deposited seeds.

SUMMARY

In one embodiment, a system for an agricultural seeding implement includes one or more processors and a memory storing instructions that when executed by the one or more processors cause the one or more processors to provide control signals to, while the agricultural seeding implement is in a lowered position work state to distribute seeds during each pass through a seeding portion of a field, a downforce actuator to drive one or more row units toward a surface of the field. The instructions, when executed by the one or more processors, also cause the one or more processors to, while the agricultural seeding implement is in a raised position work state with the one or more row units lifted off of the surface of the field to turn within a headlands portions of the field, perform a calibration check for one or more load cell sensors that are configured to measure a downforce applied by the one or more row units to the field.

In one embodiment, a method of operating an agricultural seeding implement includes controlling a downforce actuator to drive one or more row units of the agricultural seeding implement toward a surface of a field as the one or more row units distribute seeds to a field. The method also includes controlling the downforce actuator or a lift actuator to lift the one or more row units of the agricultural seeding implement off of the surface of the field as the agricultural seeding implement turns in headlands portions of the field. The method further includes performing a calibration check for one or more load cell sensors while controlling the downforce actuator or the lift actuator to lift the one or more row units of the agricultural seeding implement off of the surface of the field as the agricultural seeding implement turns in the headlands portions of the field, wherein the one or more load cell sensors are configured to measure a downforce applied by the one or more row units to the field.

In one embodiment, an agricultural seeding implement includes a toolbar comprising a toolbar frame supported on wheels and configured to couple to a work vehicle or to an air cart, a rockshaft rotatably coupled to the toolbar frame,

2 a group of row units supported on the rockshaft, and a downforce actuator coupled to the toolbar and the rockshaft, wherein the downforce actuator is configured to adjust a downforce applied by the group of row units to a field. The agricultural seeding implement also includes a controller configured to, while the agricultural seeding implement is in a lowered position work state in which the group of row units is in a first position relative to the toolbar to place the group of row units in contact with a surface of the field, provide control signals to the downforce actuator to drive the group of row units toward the surface of the field. The controller is also configured to, in response to the agricultural seeding implement transitioning from the lowered position work state to a raised position work state in which the group of row units is in a second position relative to the toolbar to raise the group of row units off of the surface of the field, perform a calibration check for one or more load cell sensors that are configured to measure the downforce applied by the group of row units to the field.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 4 is a flow diagram of an embodiment of a method of operating the agricultural seeding implement of FIG. 1;

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
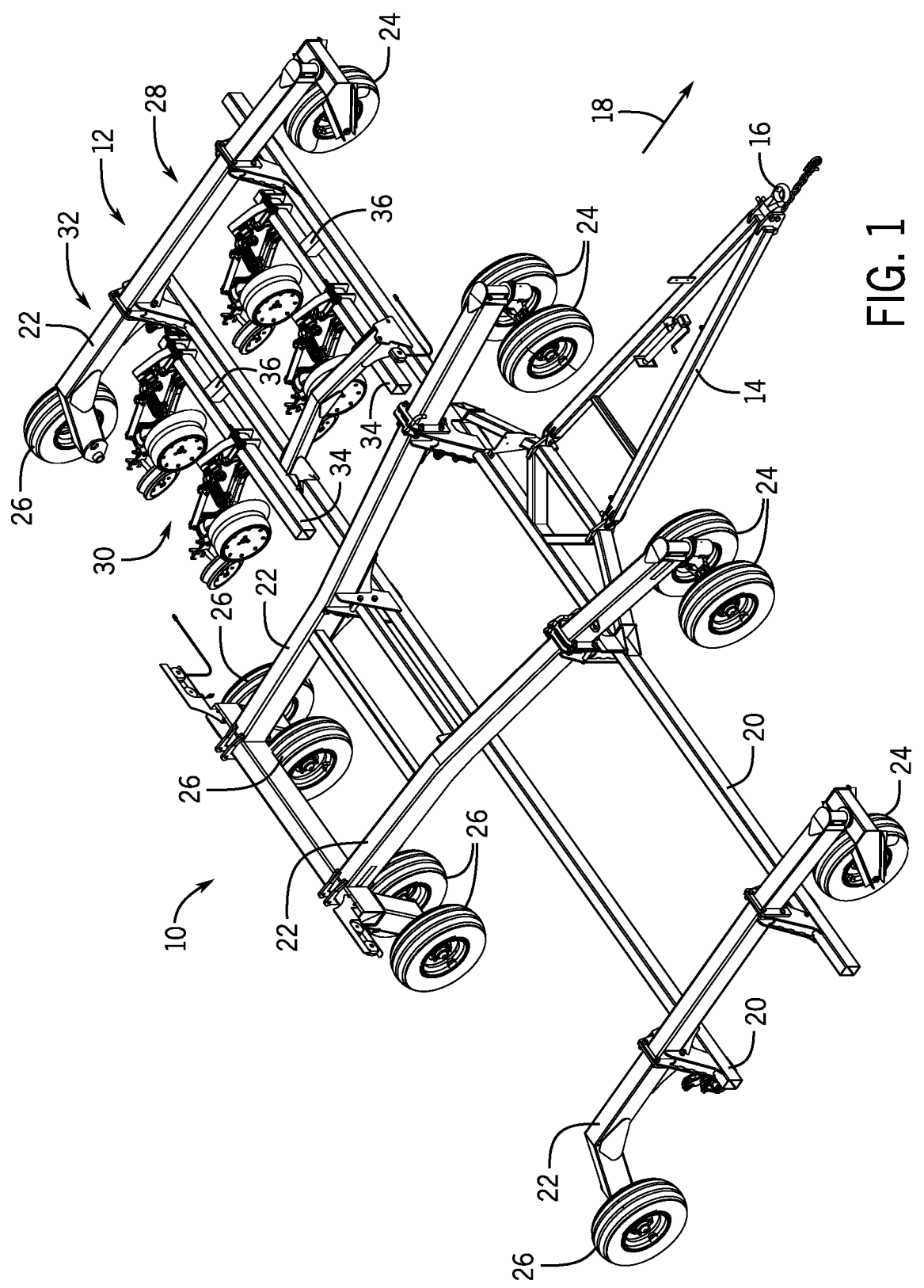
FIG. 1 is a perspective view of an embodiment of an agricultural seeding implement.

FIG. 1 is a perspective view of an embodiment of an agricultural seeding implement 10 (e.g., seeder). As illustrated, the agricultural seeding implement 10 includes a frame 12 and a tow bar 14 coupled to the frame 12. In the illustrated embodiment, the tow bar 14 is pivotally coupled to the frame 12 and includes a hitch 16. The hitch 16 is configured to interface with a corresponding hitch of a work vehicle (e.g., tractor), thereby enabling the work vehicle to tow the agricultural seeding implement 10 through a field along a direction of travel 18.

It should be appreciated that the tow bar 14 may have any suitable configuration (e.g., A-frame; a single bar extending along the direction of travel) and may be either pivotally or rigidly coupled to the frame 12. In addition, the agricultural seeding implement 10 may carry or be coupled to an air cart (e.g., via the hitch 16, and then the air cart may be coupled to the work vehicle such that the agricultural seeding implement 10 and the air cart are towed together by the work vehicle) that provides agricultural products (e.g., seeds, fertilizer) to the agricultural seeding implement 10 for distribution to into soil in the field. Furthermore, the agricultural seeding implement 10 may be towed by the work vehicle or may itself be part of a self-propelled vehicle (e.g., in which the frame of the agricultural seeding implement 10 is coupled to a main frame/chassis of the self-propelled vehicle). Regardless of the configuration, the agricultural seeding implement 10 may travel via operator control or via autonomous control. For example, the agricultural seeding implement 10 may be towed by the work vehicle that operates under control of an operator in a cab of the work vehicle or that operates autonomously (e.g., autonomously or semi-autonomously via a control system executing autonomous driving algorithms). It should be appreciated that various configurations and arrangements of the agricultural seeding implement 10 are envisioned. For example, the air cart may be towed behind the agricultural seeding implement 10. As another example, the air cart may be mounted on the agricultural seeding implement 10 (e.g., on the frame 12; a mounted tank disk drill).

In the illustrated embodiment, the frame 12 of the agricultural seeding implement 10 includes two toolbars 20 and four supports 22. Wheels are coupled to the supports 22, and the supports 22 are coupled to the toolbars 20 (e.g., via fasteners, via a welded connection). In particular, front wheel(s) 24 are rotatably coupled to a respective front portion of each support 22, and rear wheel(s) 26 are rotatably coupled to a respective rear portion of each support 22. The wheels maintain the supports 22 above the surface of the field and enable the agricultural seeding implement 10 to move along the direction of travel 18. Pivotal connections between the front wheels 24 and the respective supports 22 enable the front wheels 24 to caster, thereby enhancing the turning ability of the agricultural seeding implement 10 (e.g., at a headland, during transport). The frame 12 of the agricultural seeding implement 10 may have any number of supports 22 (e.g., 0, 1, 2, 3, 4, 5, 6, or more). Furthermore, in certain embodiments, the toolbars 20 of the frame 12 may be supported by other and/or additional suitable structures (e.g., connectors extending between toolbars, wheel mounts coupled to toolbars).

In the illustrated embodiment, a first row 28 of row units 30 is supported by the front toolbar 20, and a second row 32 of row units 30 is supported by the rear toolbar 20. The agricultural seeding implement 10 may have any number of toolbars 20 (e.g., 1, 2, 3, 4, 5, 6, or more) and corresponding rows of row units 30. Further, in the illustrated embodiment, the first row 28 of row units 30 is divided into multiple groups of row units 30 (e.g., a first group on a front ride side section, a second group on a front center section, and a third group on a front left side section). Similarly, the second row 32 of row units 30 is divided into multiple groups of row units 30 (e.g., a fourth group on a rear right side section, a fifth group on a rear center section, and a sixth group on a rear left side section). Each of the multiple groups of row units 30 is coupled to a respective rockshaft 34, which is coupled to either the front toolbar 20 or the rear toolbar 20 via a respective downforce actuator 36. For image clarity, FIG. 1 is simplified to show two row units in the first group of row units 30 on the front left side section, and the first group of row units 30 are indirectly coupled to the front toolbar 20 via the respective rockshaft 34 and the respective downforce actuator 36 (which is also represented in simplified form for image clarity). Similarly, for image clarity, FIG. 1 is simplified to show two row units in the fourth group of row units 30 on the rear left side section, and the fourth group of row units 30 are indirectly coupled to the rear toolbar 20 via the respective rockshaft 34 and the respective downforce actuator 36 (which is also represented in simplified form for image clarity). However, it should be appreciated that any number or row units (e.g., 1, 2, 3, 4, 5, 6, or more) may be included in each group of row units 30, and any number of groups of row units 30 (e.g., 1, 2, 3, 4, 5, 6, or more) may be provided across a width of the agricultural seeding implement 10.

In the illustrated embodiment, each row unit 30 of the agricultural seeding implement 10 is configured to deposit the agricultural product into the soil. For example, certain row units 30 (e.g., all of the row units 30 of the agricultural seeding implement 10, a portion of the row units 30 of the agricultural seeding implement 10, at least one row unit 30 of the agricultural seeding implement 10) include an opener disc configured to form a trench within the soil for agricultural product deposition into the soil. The row unit 30 also includes a gauge wheel (e.g., positioned adjacent to the opener disc) configured to control a penetration depth of the opener disc into the soil. For example, the opener disc may be rotatably and non-movably coupled to a frame of the row unit, and the gauge wheel may be movably coupled to the frame and configured to contact a surface of the soil during operation of the row unit. Accordingly, adjusting the vertical position of the gauge wheel relative to the frame of the row unit controls the penetration depth of the opener disc into the soil. In addition, the row unit includes a product tube (e.g., seed tube) configured to deposit the agricultural product into the trench formed by the opener disc.

Each downforce actuator 36 is configured to control a downforce applied by the gauge wheel to the soil surface. For example, in the illustrated embodiment, the agricultural seeding implement 10 includes multiple downforce actuators 36 each coupled to one rockshaft 34 and configured to control the downforce applied by the gauge wheels of the corresponding group of row units 30. The downforce actuator 36 may enable the downforce applied by the respective gauge wheel(s) to the soil surface to be adjusted based on soil condition(s), soil type, agricultural product type (e.g., seed type, fertilizer type), other suitable parameter(s), or a combination thereof. For example, the downforce may be reduced for moist soil conditions to reduce compaction, and the downforce may be increased to allow the opener disc to maintain penetration in harder soils. The operator may set a desired downforce (e.g., target downforce; 100 pounds [45 kilograms]), such as via inputs to a controller (e.g., electronic controller).

The opener disc/agricultural product tube may be followed by a closing system. In the illustrated embodiment, the closing system includes a packer assembly having a packer wheel configured to pack soil on top of the deposited agricultural product. It should be appreciated that the closing system may also be adapted to include a closing disc between the opener disc/agricultural product tub and the packer wheel along the direction of travel 18. In certain embodiments, each row unit 30 of the second row 32 is laterally offset (e.g., offset in a lateral direction perpendicular to the direction of travel 18) from a respective row unit 30 of the first row 28, such that two adjacent rows of agricultural product are established within the soil. To facilitate discussion, the agricultural seeding implement and its components (e.g., the row unit 30) may be described with reference to a lateral axis or direction 2, a longitudinal axis or direction 4, and/or a vertical axis or direction 6.

Figure 2:
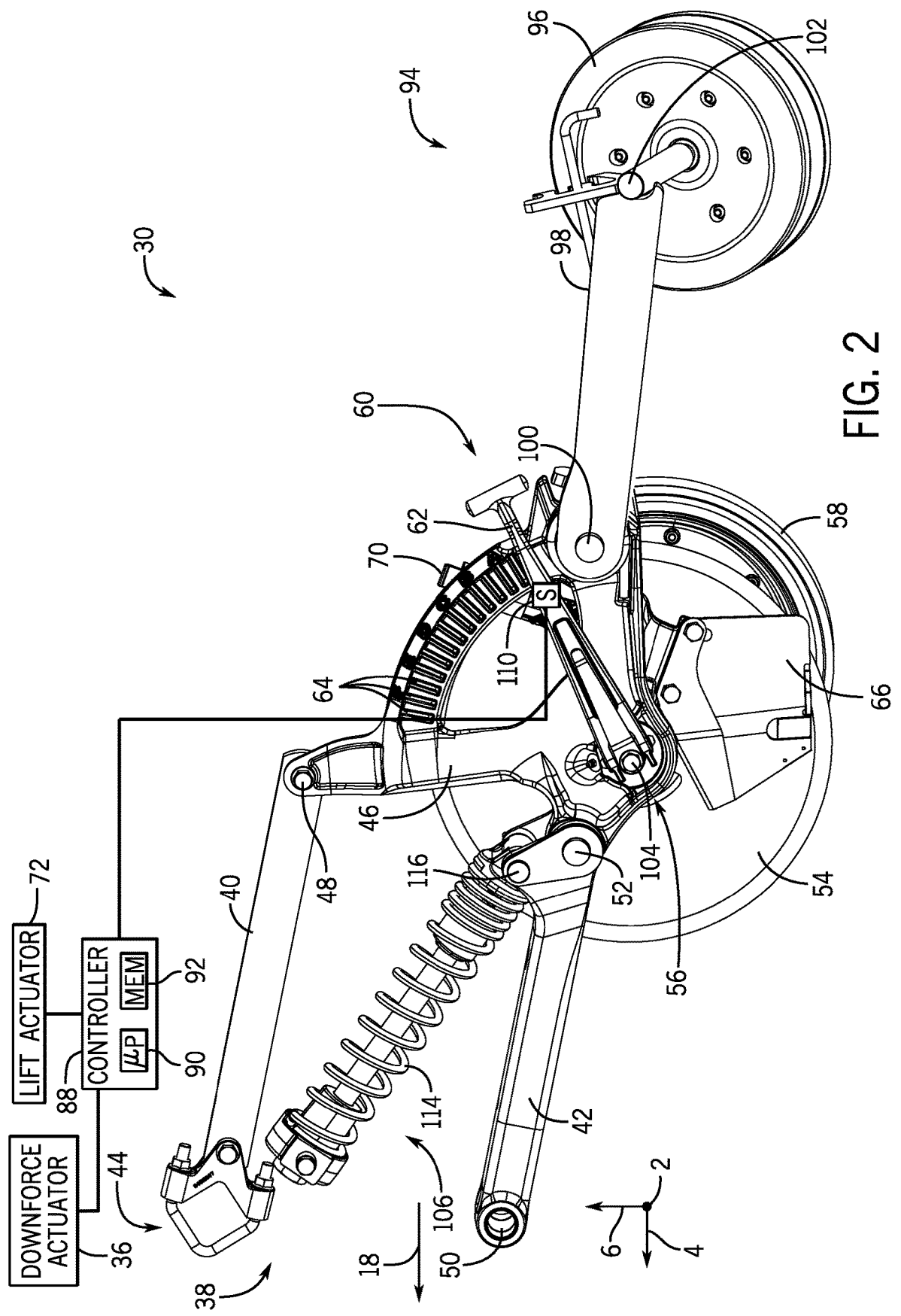
FIG. 2 is a side view of an embodiment of a row unit that may be employed within the agricultural seeding implement of FIG. 1.

FIG. 2 is a side view of an embodiment of a row unit 30 that may be employed within the agricultural seeding implement of FIG. 1. In the illustrated embodiment, the row unit 30 includes a linkage assembly 38 configured to couple (e.g., movably couple) the row unit 30 to a respective rockshaft (and thus, to a respective downforce actuator 36 and a respective toolbar) of the agricultural seeding implement. The linkage assembly 38 includes an upper link 40 and a lower link 42. A mount 44 is positioned at a first end of the upper link 40 and is configured to couple to the respective rockshaft of the agricultural seeding implement. In addition, a second end of the upper link 40 is coupled to a frame 46 of the row unit 30 by a fastener 48. The lower link 42 includes an opening 50 configured to receive a fastener that rotatably couples the lower link 42 to the respective rockshaft. In addition, a second end of the lower link 42 is coupled to the frame 46 of the row unit by a fastener (e.g., pin) 52. It should be appreciated that the row unit 30 may include any of a variety of different types of linkages or linkage assemblies to couple the row unit 30 to the respective rockshaft and/or the respective toolbar (e.g., a single arm or link).

The linkage assembly 38 enables the frame 46 of the row unit 30 to move vertically (e.g., raise and lower in the vertical direction 6) relative to the respective rockshaft and/or the respective toolbar (e.g., in response to the opener disc/gauge wheel contacting an obstruction, in response to variations in the terrain, for raising the row unit frame for transport). It should be appreciated that the row unit may include any other suitable linkage configuration to facilitate vertical movement of the row unit frame relative to the respective rockshaft and/or the respective toolbar.

In the illustrated embodiment, the row unit 30 includes an opener disc 54 (e.g., opener; opener device) rotatably and non-movably coupled to the frame 46 by a bearing assembly 56. The bearing assembly 56 enables the opener disc 54 to freely rotate as the opener disc 54 engages the soil, thereby enabling the opener disc 54 to excavate a trench within the soil. In the illustrated embodiment, the row unit 30 includes a gauge wheel 58 configured to control a penetration depth of the opener disc 54 into the soil. The gauge wheel 58 is configured to rotate along the surface of the soil. Accordingly, adjusting the vertical position of the gauge wheel 58 relative to the frame 46 controls the penetration depth of the opener disc 54 into the soil. The gauge wheel 58 is rotatably coupled to a gauge wheel support arm, and the gauge wheel support arm is pivotally coupled to the frame 46. Accordingly, pivoting of the gauge wheel support arm drives the gauge wheel 58 to move vertically relative to the frame 46. In certain embodiments, the gauge wheel 58 is positioned against the opener disc 54 to remove soil from a side of the opener disc 54 during operation of the row unit 30.

The row unit 30 includes a depth adjustment assembly 60 configured to control the vertical position of the gauge wheel 58, thereby controlling the penetration depth of the opener disc 54 into the soil. In the illustrated embodiment, the depth adjustment assembly 60 includes a depth adjustment handle 62 and depth gauge notches 64. The depth adjustment handle 62 is non-rotatably coupled to the gauge wheel support arm and configured to drive the gauge wheel support arm to pivot, thereby controlling the vertical position of the gauge wheel 58 relative to the frame 46/opener disc 54. The depth adjustment handle 62 may be moved to any of the depth gauge notches 64 to adjust the vertical position of the gauge wheel 58. The depth gauge notches 64 block rotation of the depth adjustment handle 62, thereby maintaining the vertical position of the gauge wheel 58 (e.g., substantially fixing the position of the gauge wheel 58 relative to the frame 46). To adjust the vertical position of the gauge wheel 58/penetration depth of the opener disc 54, the depth adjustment handle 62 may be moved away from the depth gauge notches 64, thereby facilitating rotation of the depth adjustment handle 62 along the depth gauge notches 64. Upon release of the depth adjustment handle 62, a biasing member may urge the depth adjustment handle 62 to engage the depth gauge notches 64, thereby blocking rotation of the depth adjustment handle 62 among the depth gauge notches 64. It should be appreciated that any other suitable depth adjustment assembly/device, such as an actuator, may be used to control the vertical position of the gauge wheel/penetration depth of the opener disc.

In the illustrated embodiment, the row unit 30 includes a scraper 66 disposed adjacent to the opener disc 54 and configured to remove accumulated soil from the opener disc 54. However, in other embodiments, the scraper may be omitted. Furthermore, the row unit 30 includes an agricultural product tube 70 (e.g., seed tube) configured to direct agricultural product into the trench formed by the opener disc 54.

The downforce actuator 36 may include a fluid actuator (e.g., hydraulic cylinder, hydraulic motor, pneumatic cylinder, pneumatic motor) or any other suitable type of actuator (e.g., electromechanical actuator, linear actuator, electric motor). The downforce actuator 36 is coupled to the respective rockshaft and the respective toolbar for the row unit 30, and the downforce actuator 36 is configured to drive the respective rockshaft relative to the respective toolbar to control a downforce applied by the gauge wheel 58 to the soil (and the downforce for all of the gauge wheels for all of the row units coupled to the respective rockshaft). In some embodiments, the downforce applied by the gauge wheel 58 to the soil may be increased by increasing a fluid pressure within the downforce actuator 36, and the downforce applied by the gauge wheel 58 to the soil may be decreased by decreasing the fluid pressure within the downforce actuator 36. A lift actuator 72 may also be configured to raise the row unit 30 (e.g., an entire group of row units coupled to the respective rockshaft) to a raised position in which the row unit 30 does not contact the soil. For example, the operator may provide an input that results in instructions to a hydraulic circuit to control the lift actuator 72 to move the row unit 30 relative to the toolbar to transition between the lowered position to be in contact with the soil and the raised position to be off of the soil. As discussed in more detail herein, it may be desirable to raise the row unit 30 to the raised position at various times, such as during headland turns, transport, and/or calibration. It should be appreciated that other configurations are envisioned, such as configurations in which the downforce actuator 36 is configured to raise the row unit 30.

In addition, a controller 88 (e.g., electronic controller) is communicatively coupled to the downforce actuator 36 and/or the lift actuator 72. The controller 88 is configured to provide a respective output signal to the downforce actuator 36 indicative of instructions to control the downforce actuator 36 and to provide a respective output signal to the lift actuator 72 of instructions to control the lift actuator 72. The controller 88 may be located in/on the agricultural seeding implement, in/on an air cart coupled to the agricultural seeding implement, in/on a work vehicle coupled to the agricultural seeding implement, or in any other suitable location that enables the controller 88 to perform the operations described herein. Further, the controller 88 may be a distributed controller or include multiple controllers/processing components, such as one controller that operates to control the downforce actuator 36 and related calibration operations and another controller to control the lift actuator 72 and related lift operations. Further, the controller in this context may include the operator (e.g., human operator; not an electronic controller) manually adjusting a switch or other component to control the lift actuator 72 (e.g., to adjust hydraulic fluid flow to and from the lift actuator 72).

In certain embodiments, the controller 88 is an electronic controller having electrical circuitry configured to control the downforce actuator 36. In the illustrated embodiment, the controller 88 includes a processor 90 and a memory device 92. The controller 88 may also include one or more storage devices and/or other suitable components. The processor 90 may be used to execute software, such as software for controlling the first valve assembly, and so forth. Moreover, the processor 90 may include multiple microprocessors, one or more "general-purpose" microprocessors, one or more special-purpose microprocessors, and/or one or more application specific integrated circuits (ASICS), or some combination thereof. For example, the processor 90 may include one or more reduced instruction set (RISC) processors.

The memory device 92 may include a volatile memory, such as random access memory (RAM), and/or a nonvolatile memory, such as read-only memory (ROM). The memory device 92 may store a variety of information and may be used for various purposes. For example, the memory device 92 may store processor-executable instructions (e.g., firmware or software) for the processor 90 to execute, such as instructions for controlling the downforce actuator 36, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling the first valve assembly), and any other suitable data.

As shown, the row unit 30 also includes a packer assembly 94 configured to close the trench formed by the opener disc 54 and to pack soil on top of the deposited agricultural product. The packer assembly 94 includes a packer wheel 96 and a packer wheel arm 98. The packer wheel arm 98 is coupled to the frame 46 at a joint 100 (e.g., non-rotatable or rotatable join; second pivot joint), and the packer wheel 96 is rotatably coupled to the packer wheel arm 98. The soil-contacting surface of the packer wheel 96 may have any suitable shape (e.g., v-shaped, flat) and/or any suitable tread pattern (e.g., chevron treads). In addition, the packer wheel arm 98 positions a rotational axis 102 of the packer wheel 96 rearward of a rotational axis 104 of the opener disc 54 relative to the direction of travel 18 of the row unit 30.

The row unit 30 includes a spring assembly 106 configured to urge the opener disc 54 into engagement with the soil, to urge the gauge wheel 58 against the soil surface, and to facilitate upward vertical movement of the frame 46 (e.g., in response to contact between the opener disc 54 and an obstruction within the field). The spring assembly 106 is rotatably coupled to the lower link 42 by a fastener 116 to enable the spring assembly 106 to rotate relative to the lower link 42. In certain embodiments, the downforce actuator is configured to compress the spring assemblies of one or more row units (e.g., a group of row units). The force applied by the downforce actuator may be controlled to control the downforce applied by the gauge wheel 58 to the soil surface (e.g., while compressing the spring 114). In addition, the spring 114 is configured to compress to facilitate upward vertical movement of the frame 46 in response to the opener disc 54 or the gauge wheel 58 encountering an obstruction (e.g., rock, branch, etc.) within the field. While the row unit includes the spring assembly in the illustrated embodiment, in other embodiments, the spring assembly may be omitted or replaced with another type of biasing member.

The row unit 30 may include a load cell sensor 110 (e.g., downforce sensor) that is configured to detect the downforce applied by the row unit 30 (e.g., the gauge wheel 58 of the row unit 30) to the soil. For example, the load cell sensor 110 include a strain gauge that detects a strain in the frame 46 of the row unit 30, which is indicative of the downforce applied by the row unit 30 to the soil. The controller 88 may receive a signal indicative of the downforce applied by the row unit 30 to the soil from the load cell sensor 110. The controller 88 may also receive (e.g., via input from the operator) a desired downforce (e.g., target downforce), and then the controller 88 may provide the output signal to the downforce actuator 36 to achieve the desired downforce (e.g., so that the downforce applied by the row unit 30 to the soil matches or corresponds to the desired downforce, or is maintained within a threshold range of the desired downforce). In embodiments with multiple load cell sensors 110 for one group of row units 30, the controller 88 may combine measured values of the multiple load cell sensors 110 for the one group of row units 30 (e.g., via averaging or other algorithms) to determine and to provide the output signal to the downforce actuator 36 that is coupled to the respective rockshaft for the one group of row units 30 (e.g., to maintain a combined measured value based on the measured values of the multiple load cell sensors 110 within the threshold range of the desired downforce, wherein the combined measured value is indicative of the downforce applied by the row units 30 in the group of row units 30 to the soil). It should be appreciated that, in some embodiments, the controller 88 may determine the desired downforce based on soil condition(s), residue characteristics (e.g., coverage), trench closing effectiveness, or a combination thereof. Further, it should be appreciated that multiple load cell sensors may be provided on the agricultural seeding implement, such as one for each group of row units, more than one (e.g., 2, 3, 4, or more) for each group of units, and/or one for each row unit, for example. While the load cell sensor 110 is shown on the depth adjustment handle 62 in FIG. 2, it should be appreciated that the load cell sensor 110 may located at other positions on the row unit 30.

Prior to performing seeding operations, the operator may calibrate (e.g., zero) the load cell sensor 110 (e.g., all of the load cell sensors of the agricultural seeding implement). Generally, this calibration is carried out while the row units 30 are in the raised position and while the agricultural seeding implement is in a stationary and level position. Then, as the agricultural seeding implement travels through a field, the load cell sensor 110 monitors the downforce applied by the row unit 30 to the soil and the control 88 controls the downforce actuator 36 to maintain the downforce applied by the row unit 30 to the soil at the desired downforce.

However, it is presently recognized that the load cell sensor 110 may experience drift during the seeding operations, such that the load cell sensor 110 is no longer properly calibrated (e.g., zeroed) and no longer provides accurate measurements of the downforce applied by the row unit 30 to the soil. This, in turn, may result in improper downforce control (e.g., the downforce applied by the row unit 30 to the soil does not correspond to the desired downforce) and poor seed depth in the soil. The load cell sensor 110 may drift for any of a variety of reasons, such as mechanical damage to the load cell sensor 110 (e.g., due to striking rocks in the field or manufacturing issues, such as delamination of the strain gauge), moisture entry into a housing of the load cell sensor 110, or drift in electronics of the load cell sensor 110.

Figure 3:
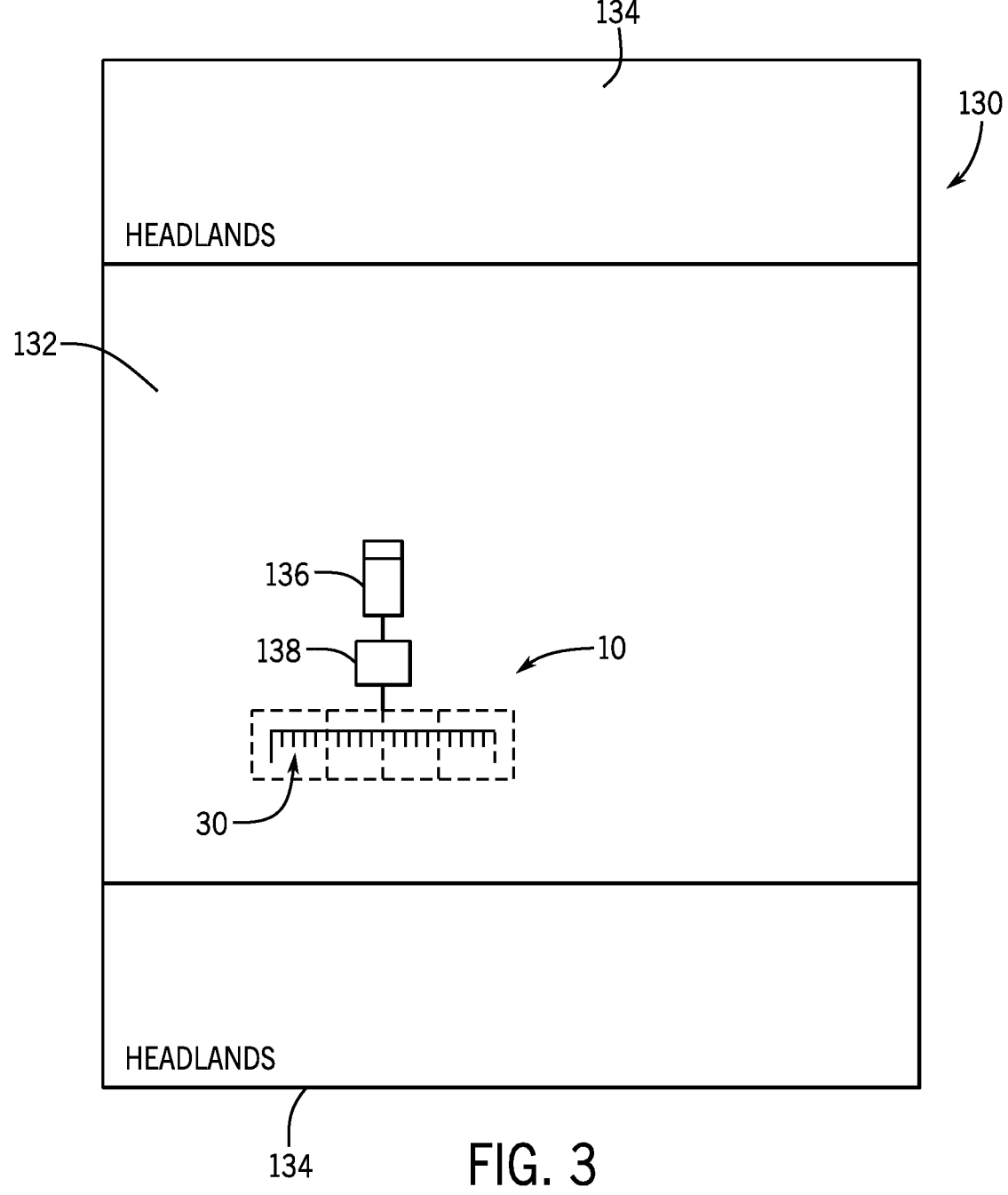
FIG. 3 is a top view of an embodiment of the agricultural seeding implement of FIG. 1 traveling through a field.

FIG. 3 is a top view of an embodiment of the agricultural seeding implement 10 of FIG. 1 traveling through a field 130. As the agricultural seeding implement 10 travels through a seeding section 132 of the field 130 with the row units 30 in the lowered position (e.g., engaged or in contact with the soil) to distribute agricultural product into the soil, the load cell sensor(s) readings vary continuously and a calibration status (e.g., zero drift) of the load cell sensor(s) cannot be verified. However, as the agricultural seeding implement 10 travels through a headlands portion 134 of the field 130, the row units 30 moved to the raised position to facilitate turning the agricultural seeding implement 10 to make another pass through the seeding section 132 of the field 130, as well as to block distribution of the agricultural product into the soil.

In some embodiments, the controller may perform a calibration check (e.g., zero check) to identify drift of the load cell sensor(s) while the row units 30 are in the raised position, such as while the row units 30 are in the raised position during a headlands turn in the headlands portion 134 of the field. The controller may perform the calibration check automatically (e.g., without separate input from the operator, such as without selection of any separate virtual button from the operator) in response to the row units 30 being in the raised position (e.g., being instructed to move to the raised position or to be in a raised position work state). Indeed, the controller may perform the calibration check during each headlands turn, and in this way, the controller may repeatedly perform the calibration check during the seeding operation. Advantageously, the controller may repeatedly perform the calibration check during the seeding operation without interrupting a flow of the seeding operation or reducing efficiency of the seeding operation (e.g., because the calibration check can be performed while the agricultural seeding implement 10 is moving, such as moving through the headland turn; without the agricultural seeding implement 10 being stationary).

The controller may carry out certain steps to provide an accurate calibration check even during movement of the agricultural seeding implement 10. In particular, the controller may detect when the row units 30 move to the raised position (e.g., physically move to break contact with the soil or are instructed to move to the raised position; via signals from sensors or switches located on the row units 30; upon activation of a work state sensor or switch, such as by the operator and/or the controller, to move the row units 30 to the raised position; upon receipt of input by the operator to move the row units 30 to the raised position; upon instruction from the controller to move the row units 30 to the raised position according to a map of the field 130 and a tracked position of the agricultural seeding implement 10; based on readings from the load cell sensor(s), such as upon all readings changing to near-zero at approximately the same time). In response, the controller may wait for a first period of time (e.g., a wait time) to enable signals from the load cell sensor(s) to stabilize (e.g., at or near their zero value, as long as the load cell sensor(s) have not experienced drift). The controller may filter the signals from the load cell sensor(s) to reduce noise caused by movement of the agricultural seeding implement 10. The controller may capture or isolate the signals from the load cell sensor(s) over a second period of time (e.g., a measurement time). The first period of time and the second period of time may have any suitable duration (e.g., 1, 2, 3, 4, 5, or more seconds). For example, the first period of time may be three seconds, and the second period of time may be two seconds. The controller may analyze the signals from the load cell sensor(s) from the second period of time to determine a respective measured value for each of the load cell sensor(s). For example, the respective measured value for a particular load cell sensor may be an average force over the second period of time based on the respective signal generated by the particular load cell sensor over the second period of time.

The controller may analyze the signals from the load cell sensor(s) to determine whether the measured value(s) correspond to an acceptable threshold range (e.g., within a range centered about zero pounds of downforce, such as plus or minus 20 pounds [9 kilograms] of downforce or plus or minus some percentage of the desired downforce). If the measured value for a particular load cell sensor is within the acceptable threshold range, then the controller may determine that the particular load cell sensor is properly or sufficiently calibrated (e.g., has not experienced significant drift). However, if the measured value for the particular load cell sensor is not within the acceptable threshold range, then the controller may determine and record an event for the particular load cell sensor. In some embodiments, the controller may provide an alarm to alert the operator in response to the event. The alarm may include a text message presented on a display screen for visualization by the operator (e.g., in a work vehicle 136 that tows the agricultural seeding implement 10 and/or related equipment, such as an air cart 138) through the field 130. The alarm, such as via text in the text message, may indicate occurrence of the event, describe likely or possible drift of the load cell sensor, and so forth.

In some embodiments, the controller may implement an event counter to reduce or to block false alarms. Thus, as the agricultural seeding implement 10 travels back and forth across the field 130 and performs multiple headlands turns, the controller may perform the calibration check in each of the multiple headlands turns and count a respective event each time a respective measured value for a respective load cell sensor is not within the acceptable threshold range. The controller may sum the respective events for each load cell sensor to calculate and track of a respective total number of events for each load cell sensor. Then, the controller may provide the alarm to alert the operator in response to the respective total number of events for one of the load cell sensor(s) exceeding an event threshold. That is, the controller does not provide the alarm in response to each event, but only once the respective total number of events for one of the load cell sensor(s) exceeding an event threshold. The event threshold may be set to any suitable value, such as 2, 3, 4, 5, or more events. In some embodiment, the controller may utilize separate event counters to separately count positive readings above the acceptable threshold range and to separately count negative readings below the acceptable threshold range. Further, negative readings below the acceptable threshold range may have greater negative impact on seeding operations (e.g., as compared to positive readings above the acceptable threshold range). Thus, the event threshold may be set to a first, lower number (e.g., 3) for the negative readings below the acceptable threshold range and to a second, higher number (e.g., 5) for the positive readings above the acceptable threshold range.

It is presently recognized that certain conditions, such as a rock being temporarily jammed into certain portions of a row unit (e.g., between the gauge wheel and the opener disc) may cause the measured value for the particular load cell sensor to fall outside of the acceptable threshold range. However, when the row unit is returned to the lowered position, the rock may fall out of the row unit and the particular load cell sensor may be properly or sufficiently calibrated so as to continue to accurately monitor the downforce applied by the row unit to the soil. The event counter results in the alarm being held until the measured value for the particular load cell sensor falls outside of the acceptable threshold range multiple times, such as due to drift or other reasons that warrant further maintenance from the operator (e.g., the rock remains jammed through multiple headland turns, and therefore should be manually removed so that the particular load cell sensor can resume accurate measurements to support desirable seed depth in the soil). In some embodiments, if the event counter for the particular load cell sensor includes one or more events, the event counter for the particular load cell sensor may be decremented (e.g., not below zero events) if a next measured value (e.g., in the next headlands turn) is for the particular load cell sensor is within the acceptable threshold range. More particularly, if after two readings that are outside of the acceptable threshold range, the load cell sensor provides a reading that is within the acceptable threshold range, then the controller decrements the event counter to one event (e.g., rather than staying at two events). In this way, the event counter is effectively tracking and providing the alarm in response to multiple sequential events (or nearly sequential events, such as two events followed by one decrement and then followed by two events). For example, when the event threshold is set to three events, the event counter provides the alarm once there is three more out of range measured values (e.g., over three separate headlands turns) than in range measured values (e.g., over three separate headlands turns). Thus, the alarm may indicate that there is significant, long term (e.g., persistent, sustained) drift or error in the calibration (e.g., zero readings) for the particular load cell sensor. Notably, such techniques may provide advantages over continuing to sum events (which may cause false alarms from widely separated events from other causes and/or that do not indicate recurring drift) or zeroing the event counter in response to the reading that is within the acceptable threshold range (which may not detect recurring drift unless it occurs during each calibration check).

The alarm may take various forms and provide various information, including recommendations, to the operator. For example, the alarm may prompt or recommend that the operator to stop the agricultural seeding implement 10 to carry out the calibration process (e.g., to zero the load cell sensor(s)). In some embodiments, in response to the agricultural seeding implement 10 reaching a stop (e.g., becoming stationary) after the alarm, a notification (e.g., pop up notification) with a virtual button to initiate the calibration process and/or additional information may be presented on the display screen. For example, the notification may include the virtual button, that if selected by the operator, will cause the controller to instruct movement of all or some of the row units 30 (e.g., at least the group of row units 30 with a particular load cell sensor(s) that demonstrates drift or error) to the raised position, and then to calibrate (e.g., zero) all or some of the load cell sensor(s) associated with the row units 30 that are in the raised position (e.g., at least the particular load cell sensor(s) that demonstrates drift or error). The notification may also include the additional information, which may include a schematic diagram or table that provides all of the measured value(s) from all of the load cell sensor(s) of the agricultural seeding implement 10, the respective total number of events for each of the load cell sensor(s) of the agricultural seeding implement 10, color coding to indicate the load cell sensor(s) that demonstrates drift or error, and so forth.

In some embodiments, the notification may recommend and/or enable the operator to disable a particular load cell sensor(s) that demonstrates recurring drift or error (e.g., repeatedly during the seeding operations). In some cases, the controller may automatically disable the particular load cell sensor(s) that demonstrates recurring drift or error. In some cases, the controller may continue to use the particular load cell sensor(s) that demonstrates recurring drift or error, but weigh their input differently (e.g., lower) than the other load cell sensor(s) that did not demonstrate recurring drift or error. For example, if a particular load cell sensor results in activation of the alarm after every few headlands turns, the particular load cell sensor has likely malfunctioned and cannot maintain its calibration. The particular load cell sensor should be replaced, but it is often not convenient or practical to make a replacement until the seeding operations are complete for the field 130. Thus, disabling the particular load cell sensor(s) in this way allows the controller to control the downforce actuator(s) 36 based on other load cell sensor(s) that are generally working properly and also to provide more helpful alarms for the remaining load cell sensor(s) that are generally working properly (but that might still experience occasional and/or slow drift from zero).

It should be appreciated that variations in measurement techniques may be employed. For example, the controller may consider "start data" and "end data" during each headlands turn. In such cases, in response to the controller detecting that the row units 30 are being moved to the raised position, the controller may wait for the first period of time to enable signals from the load cell sensor(s) to stabilize. The controller may filter the signals from the load cell sensor(s) to reduce noise caused by movement of the agricultural seeding implement 10. The controller may capture or isolate the signals from the load cell sensor(s) over the second period of time (e.g., a measurement time), and particularly from a first portion of the second period of time (e.g., beginning portion to obtain the "start data"; the first two seconds after the first period of time) and a second portion of the second period of time (e.g., end portion to obtain the "end data"; the last two seconds before moving toward or placing the row units 30 on the soil). For each load cell sensor(s), the controller may compare the respective measured value from the first portion of the second period of time to the respective measured value from the second portion of the second period of time. A difference (e.g., a threshold difference, such as 5 pounds [2.2 kg]) between the two respective measured values may indicate that debris (e.g., the rock) was temporarily jammed into the corresponding row unit 30, but was released or dislodged during the headlands turn. In such cases, the controller may not count an event for the particular load cell sensor, even if the respective measured value from the first portion of the second period of time was outside of the acceptable threshold range (or possibly even if both the respective measured values from the first portion of the second period of time and the respective measured value from the second portion of the second period of time were outside of the acceptable threshold range). In some embodiments, the controller may consider the signals over an entirety of the second period of time, such that the controller may capture or isolate the signals from the load cell sensor(s) as soon as the first period of time is complete (e.g. to stabilize the signals) until moving toward or placing the row units 30 on the soil (e.g., over an entirety of the headlands turn, except for the period of time to allow the signals to stabilize). In such cases, the controller may calculate the measured value(s) based on the signals over the entirety of the second period of time and/or analyze variations over the entirety of the second period of time (e.g., and if over a threshold variation, the controller will not count an event). In some embodiments, the controller may consider the signals over the first time period, such that the controller may capture or isolate the signals from the load cell sensor(s) immediately in response to the controller detecting that the row units 30 are being moved to the raised position, and then calculate the measured value(s) based on the signals as described herein (e.g., in combination with the signals captured or isolated during all or portions of a remainder of the headlands turn).

As noted herein, the controller may simultaneously and separately monitor multiple load cell sensors across of the agricultural seeding implement 10. For example, the multiple load cell sensors may be distributed such that one load cell sensor is provided for each of the row units 30, the multiple load cell sensors may be distributed such that two load cell sensors are provided for each group of row units, or any other suitable configuration. In any case, the controller may count and track event(s) as described herein for each of the multiple load cell sensors, and then may provide the alarm for any one of the multiple load cell sensors as described herein.

Further, in some embodiments, the controller may analyze the measurement values for the multiple load cell sensors for each group of row units (e.g., which are coupled to one respective rockshaft and respective downforce actuator) together. The measurement values for the multiple load cell sensors may indicate a maintenance issue. For example, consistently elevated measurement values for the multiple load cell sensors may indicate that the respective downforce actuator is not working properly and did not lift the group of row units off of the soil. The controller may initiate an additional alarm, including an additional notification with prompts and/or recommendations, to notify the operator of the maintenance issue. In some cases, the measurement values for the multiple load cell sensors may indicate a work state of the group of row units (e.g., a sudden change from a high downforce to a zero or near-zero downforce for all of the multiple load cell sensors may indicate that the work state includes the raised position, while a sudden change from the zero or near-zero downforce to the high downforce may indicate that the work state includes the lowered position). This may provide additional information to corroborate a status of the work state sensor or switch, or may be utilized in lieu of the work state sensor or switch (if it is not present or is not operational).

FIG. 4 is a flow diagram of an embodiment of a method 150 of operating the agricultural seeding implement of FIG. 1. The flowchart includes various steps represented by blocks. Although the flowchart illustrates the steps in a certain sequence, it should be understood that the steps may be performed in any suitable order and certain steps may be carried out simultaneously, where appropriate. Further, certain steps may be omitted and/or other steps may be added. While certain steps are described as being performed by a controller, it should be understood that the steps or portions thereof may be performed by any suitable processing device.

Generally, the method 150 includes a process of controlling a downforce actuator to drive a group of row units toward a soil surface of a field while the agricultural seeding implement is in a lowered position work state, and controlling a lift actuator (or other suitable actuator) to lift the group of row units off of the soil surface of the field while the agricultural seeding implement is in a raised position work state in headlands portions of the field. Further, the method 150 includes performing a calibration check for one or more load cell sensors that are configured to measure a downforce applied by the group of row units to the field upon each occurrence of the agricultural seeding implement being in the raised position work state in the headlands portions of the field. Additional features and details that may be implemented to perform the method 150 are described herein.

In block 152, the method 150 may begin with the controller receiving, from one or more load cell sensors, signals indicative of a downforce applied by a group of row units to a soil surface during seeding operations. In block 154, the method 150 may continue with the controller providing control signals to a downforce actuator to maintain the downforce applied by the group of row units to the soil surface within a desired downforce range during the seeding operations. This may enable proper seed depth as an agricultural implement with the group of row units travels across a field to carry out the seeding operations. As discussed herein, the desired downforce range may be set by an operator and/or established by the controller based on soil conditions, for example.

In block 156, the method 150 may continue with the controller receiving an indication of transition of the group of row units to a raised position work state, which may occur during entry into a headlands turn and upon input from the operator to control the lift actuator. While the group of row units is in the raised position work state, the controller no longer (e.g., stops; halts) provides the control signals to the downforce actuator. This is because, while the group of row units is in the raised position work state, the controller will not be able to achieve the desired downforce range. Then, once the group of row units is returned to the lowered position work state, the controller will again provide the control signals to the downforce actuator (e.g., re-activate the downforce actuator to maintain the desired downforce range). In block 158, the method 150 may continue with the controller receiving, from the one or more load cell sensors, additional signals during the raised position work state, such as during the headlands turn.

In block 160, the method 150 may continue with the controller processing the additional signals to obtain respective measured value(s) for the one or more load cell sensors during the raised position work state, such as during the headlands turn. As discussed herein, the one or more load cell sensors may be calibrated (e.g., zeroed) prior to the seeding operations, such as while the agricultural seeding implement is in a stationary position. Thus, once the group of row units is in the raised position work state, it is expected that the one or more load cell sensors will provide respective signals indicative of zero (or nearly zero) downforce.

As discussed herein, the controller may process the additional signals in any of a variety of ways. For example, the controller may wait for a first period of time (e.g., a wait time) to enable the additional signals from the one or more load cell sensor to stabilize (e.g., at or near their zero value, as long as the one or more load cell sensors have not experienced drift). The controller may filter the signals from the one or more load cell sensors to reduce noise caused by movement of the agricultural seeding implement. The controller may capture or isolate the additional signals from the one or more load cell sensors over a second period of time (e.g., a measurement time). The first period of time and the second period of time may have any suitable duration (e.g., 1, 2, 3, 4, 5, or more seconds). For example, the first period of time may be three seconds, and the second period of time may be two seconds. The controller may analyze the additional signals from the one or more load cell sensors from the second period of time to determine the respective measured values for each of the one or more load cell sensors. For example, the respective measured value for a particular load cell sensor may be an average force over the second period of time based on the respective signal generated by the particular load cell sensor over the second period of time.

In block 162, the method 150 may continue with the controller analyzing the respective measured values for each of the one or more load cell sensors to determine whether the respective measured values correspond to an acceptable threshold range (e.g., within a range centered about zero pounds of downforce, such as plus or minus 20 pounds [9 kilograms] of downforce or plus or minus some percentage of the desired downforce). If the respective measured values for the one or more load cell sensors are within the acceptable threshold range, then the controller may determine that the one or more load cell sensors are properly or sufficiently calibrated (e.g., has not experienced significant drift). Accordingly, the method 150 may proceed to block 164. In block 164, the method 150 may continue with the controller receiving an additional indication of return (e.g., via the lift actuator or work state sensor) of the group of row units to a lowered position work state to continue the seeding operations (e.g., as the agricultural seeding implement exits the headlands turn).

However, if the respective measured values for at least one of the one or more load cell sensors are not within the acceptable threshold range, then the controller may identify a potential issue with calibration. Accordingly, the method 150 may proceed to block 166. In block 166, the method 150 may continue with counting an event for each respective load cell sensor that demonstrates the respective measured values that are not within the acceptable threshold range. In some embodiments, the controller may implement an event counter, which may reduce or to block false alarms.

Accordingly, in block 168, the method 150 may continue with the controller determining whether a total number of events for the respective load cell sensor is under or within an event threshold. If the total number of events for each load cell sensor is under or within the event threshold, then the controller may determine that the one or more load cell sensors are properly or sufficiently calibrated (e.g., has not experienced persistent drift). Accordingly, the method 150 may proceed to block 164. In block 164, the method 150 may continue with the controller receiving the additional indication of return (e.g., via the lift actuator or work state sensor) of the group of row units to a lowered position work state to continue the seeding operations (e.g., as the agricultural seeding implement exits the headlands turn).

However, if the total number of events for at least one of the one or more load cell sensors meets or exceeds the event threshold, then the controller may determine that the one or more load cell sensors are not properly or sufficiently calibrated (e.g., has experienced persistent drift). Accordingly, the method 150 may continue to block 170. In block 170, the method 150 may continue with the controller providing an alarm. The alarm may take various forms and provide various information, including recommendations, to the operator. For example, the alarm may prompt or recommend that the operator to stop the agricultural seeding implement to carry out the calibration process (e.g., to zero the one or more load cell sensors). As noted herein, the controller may prompt the operator to disable, automatically disable, and/or automatically adjust weights applied to a particular load cell sensor(s) that has drifted.

Thus, with the method 150, as the agricultural seeding implement travels back and forth across the field and performs multiple headlands turns, the controller may perform a calibration check in each of the multiple headlands turns and count a respective event each time a respective measured value for a respective load cell sensor is not within the acceptable threshold range. The controller may sum the respective events for each load cell sensor to calculate and track of a respective total number of events for each load cell sensor. Then, the controller may provide the alarm to alert the operator in response to the respective total number of events for one of the load cell sensor(s) exceeding an event threshold. That is, the controller does not provide the alarm in response to each event, but only once the respective total number of events for one of the load cell sensor(s) exceeding an event threshold. The event threshold may be set to any suitable value, such as 2, 3, 4, 5, or more events. As noted herein, other variations in the method are envisioned, including various techniques for capturing or isolating the signals from the one or more load cell sensors, deprecating events, and so forth.

Figure 5:
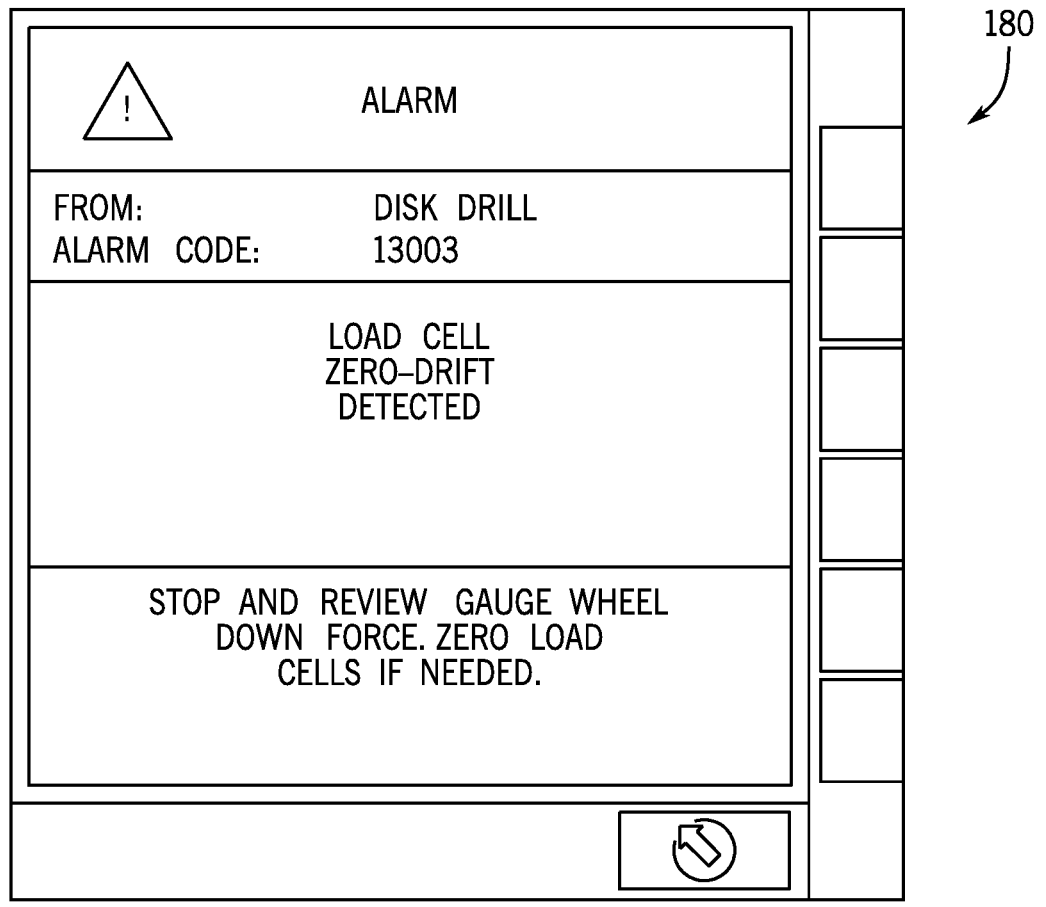
FIG. 5 illustrates an example graphical user interface (GUI) that may be presented for visualization by the operator of the agricultural seeding implement of FIG. 1, wherein the GUI indicates an alarm due to detection of drift of one or more load cell sensors of the agricultural seeding implement.

FIG. 5 illustrates an example graphical user interface (GUI) 180 that may be presented for visualization by the operator of the agricultural seeding implement of FIG. 1, wherein the GUI 180 indicates an alarm due to detection of drift of one or more load cell sensors of the agricultural seeding implement. As noted herein, the alarm may take various forms and provide various information, including recommendations, to the operator. For example, as shown in the GUI 180, the alarm may include a text message that indicates a source of the alarm (e.g., the agricultural seeding implement) and/or an alarm code that the operator may recognize or lookup in an operator's manual to gather more information. Further, the alarm may include an explanation or description of the alarm, such as "Load Cell Zero-Drift Detected." Further, the alarm may prompt or recommend that the operator take some action, such as to review the measured values indicative of the downforce and/or to carry out the calibration process (e.g., to zero the load cell sensor(s)).

Figure 6:
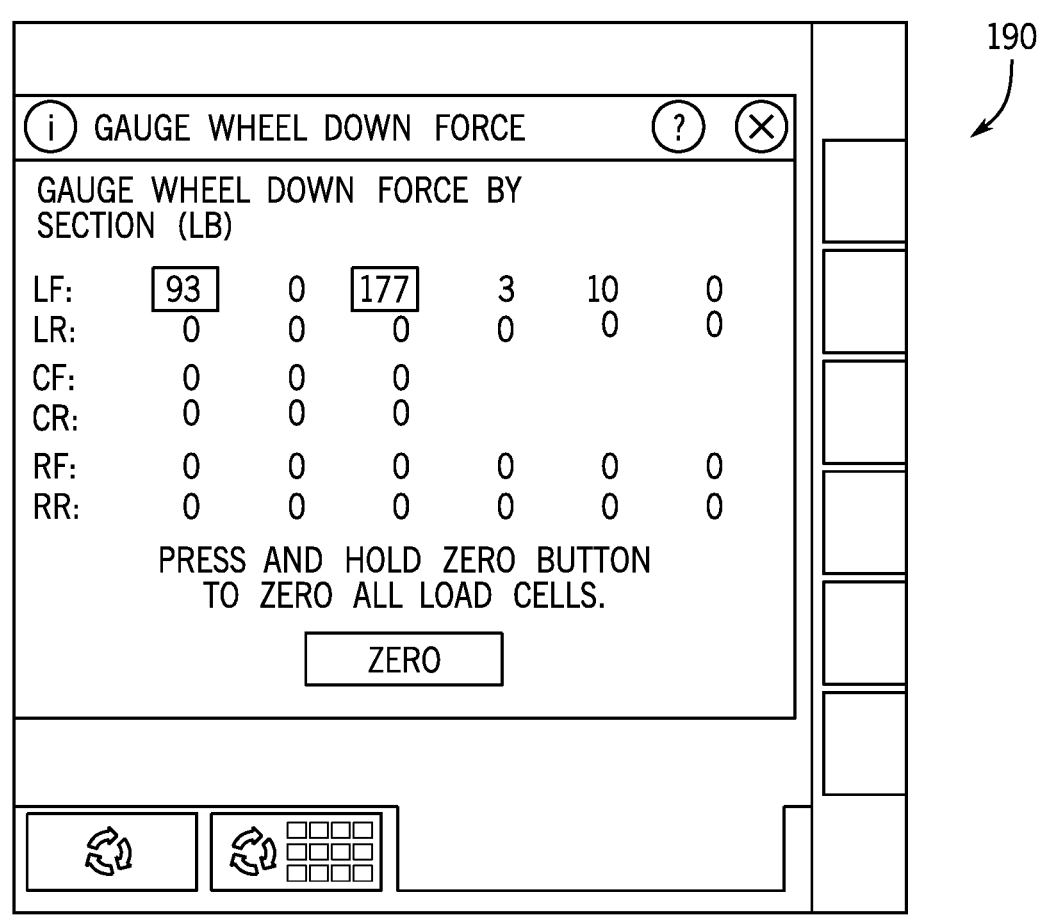
FIG. 6 illustrates another example of a GUI that may be presented for visualization by an operator of the agricultural seeding implement of FIG. 1, wherein the GUI indicates a downforce by section across the agricultural seeding implement.

FIG. 6 illustrates an example of a graphical user interface (GUI) 190 that may be presented for visualization by the operator of the agricultural seeding implement of FIG. 1, wherein the GUI 190 indicates a downforce by section across the agricultural seeding implement. In some embodiments, operator selection of a virtual button in the GUI of FIG. 5 may cause display of the GUI 190. Further, in some embodiments, bringing the agricultural seeding implement to a stop after activation of the alarm (e.g., after display of the GUI of FIG. 5) may cause display of the GUI 190. However, it should be appreciated any of a variety of inputs or actions may cause display of the GUI 190.

As shown, the GUI 190 includes a table with a first row ("LF") that provides the measured values for the load cell sensors associated with one group of row units in a front left section, a second row ("LR") that provides the measured values for the load cell sensors associated with one group of row units in a rear left section, a third row ("CF") that provides the measured values for the load cell sensors associated with one group of row units in a front center section, a fourth row ("CR") that provides the measured values for the load cell sensors associated with one group of row units in a rear center section, a fifth row ("RF") that provides the measured values for the load cell sensors associated with one group of row units in a front right section, and a sixth row ("RR") that provides the measured values for the load cell sensors associated with one group of row units in a rear right section.

In the illustrated embodiment, each row includes multiple measured values that each correspond to one load cell sensor (e.g., each side section includes six load cell sensors, and the center section includes three load cell sensors). The measured values that are out of range (e.g., as part of a single event, or as part of a last event that caused the total number of events to meet or exceed the event threshold) may be highlighted, such as via bold font, red or other colors, boxes, and so forth. Further, the GUI 180 may provide selectable virtual buttons that enable the operator to view other information and/or to initiate other operations. For example, the GUI 190 may include a virtual button ("Zero") that, if selected by the operator, will initiate the calibration process for the load cell sensors (e.g., automatically if the agricultural seeding implement is stationary; once the agricultural seeding implement is stationary). As noted herein, the GUI 190 or any other suitable GUI may recommend and/or enable the operator to disable a particular load cell sensor(s) that demonstrates recurring drift or error (e.g., repeatedly during the seeding operations).

Figure 7:
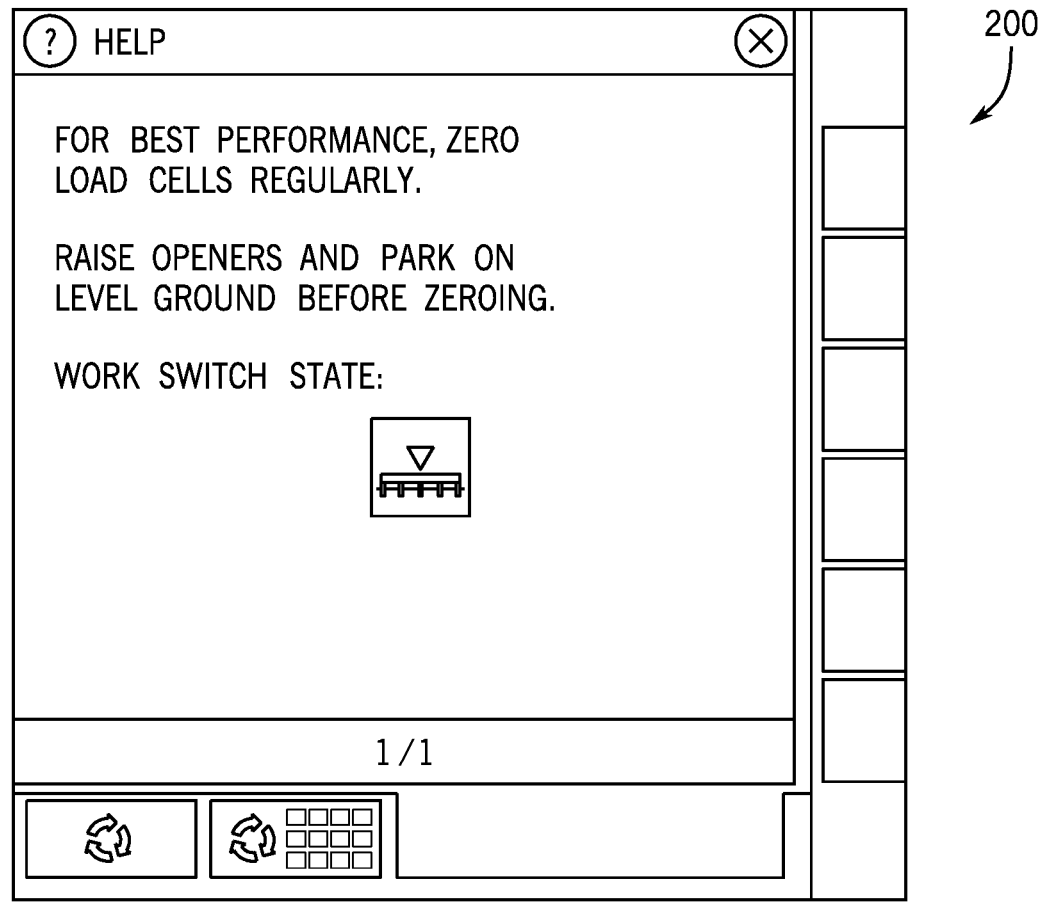
FIG. 7 illustrates another example GUI that may be presented for visualization by an operator of the agricultural seeding implement of FIG. 1, wherein the GUI provides a recommendation to calibrate (or zero) the one or more load cell sensors of the agricultural seeding implement.

FIG. 7 illustrates another example GUI 200 that may be presented for visualization by an operator of the agricultural seeding implement of FIG. 1, wherein the GUI 200 provides a recommendation to calibrate (or zero) the one or more load cell sensors of the agricultural seeding implement. For example, the GUI 200 may be presented at start up of the agricultural seeding implement and enable the operator to view an indicator of a work switch state (e.g., whether the row units are in a lowered position work state or a raised position work state). In some cases, the GUI 200 may include a virtual button ("Work switch state" virtual button) that, if selected by the operator, changes the work state of the row units (e.g., to raise the row units to initiate the calibration process). However, it should be appreciated any of a variety of inputs or actions may cause display of the GUI 190.

While only certain features have been illustrated and described herein, many modifications and changes will occur to those skilled in the art. It is, therefore, to be understood that the appended claims are intended to cover all such modifications and changes as fall within the true spirit of the disclosure. Furthermore, features shown and described with reference to FIGS. 1-7 may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system for an agricultural seeding implement, the system comprising:

a controller comprising one or more processors;

a memory storing instructions that when executed by the controller cause the controller to:

while the agricultural seeding implement is in a lowered position work state to distribute seeds during each pass through a seeding portion of a field, provide control signals to a downforce actuator to drive one or more row units toward a surface of the field; and while the agricultural seeding implement is in a raised position work state with the one or more row units lifted off of the surface of the field to turn within a headlands portions of the field, perform a calibration check for one or more load cell sensors that are configured to generate signals indicative of respective measured values of a downforce applied by the one or more row units to the field, wherein the calibration check comprises comparing the respective measured values to an acceptable threshold range that comprises zero downforce.

2. The system of claim 1, wherein the instructions, when executed by the controller, cause the controller to;

determine that the agricultural seeding implement transitioned from the lowered work position to the raised position work state based on a change in the respective measured values of the downforce indicated by the signals from the one or more load cell sensors; and perform the calibration check for the one or more load cell sensors in response to determining that the agricultural seeding implement transitioned to the raised position work state and while the agricultural seeding implement is in the raised positioned work state.

3. The system of claim 1, wherein the instructions, when executed by the controller, cause the controller to perform the calibration check by:

recording an event for a first load cell sensor of the one or more load cell sensors in response to the respective measured value for the first load cell sensor being outside of the acceptable threshold range.

4. The system of claim 3, wherein the instructions, when executed by the controller, cause the controller to perform the calibration check by:

providing an alarm in response to the respective measured value for the first load cell sensor being outside of the acceptable threshold range.

5. The system of claim 3, wherein the instructions, when executed by the controller, cause the controller to perform the calibration check by:

excluding initial portions of the signals generated by the one or more load cell sensors during a first time period of the raised position work state; and determining, based on other portions of the signals generated by the one or more load cell sensors during a second time period of the raised position work state after the first time period, the respective measured values for the one or more load cell sensors.

6. The system of claim 5, wherein the first time period comprises about one, two, three, four, or five seconds.

7. The system of claim 6, wherein the second time period comprises about one, two, three, four, or five seconds immediately after the first time period.

8. The system of claim 3, wherein the instructions, when executed by the one or more processors, cause the one or more processors to perform the calibration check by:

calculating a total number of events for the first load cell sensor in response to recording the event;

comparing the total number of events to an event threshold; and providing an alarm in response to the total number of events meeting or exceeding the event threshold.

9. The system of claim 8, wherein the alarm comprises a notification presented on a display screen for visualization by an operator of the agricultural seeding implement.

10. The system of claim 9, wherein the notification provides a recommendation to stop the agricultural seeding implement to carry out a calibration process for at least the first load cell sensor.

11. The system of claim 1, wherein the instructions, when executed by the controller, cause the controller to perform the calibration check by:

filtering the signals to remove noise caused by movement of the agricultural seeding implement while the agricultural seeding implement is in the raised position work state and turns within the headlands portions of the field.

12. A method of operating an agricultural seeding implement, the method comprising:

controlling, via one or more processors, a downforce actuator to drive one or more row units of the agricultural seeding implement toward a surface of a field as the one or more row units distribute seeds to a field;

controlling, via the one or more processors, the downforce actuator or a lift actuator to lift the one or more row units of the agricultural seeding implement off of the surface of the field as the agricultural seeding implement turns in headlands portions of the field; and performing, via the one or more processors and while controlling the downforce actuator or the lift actuator to lift and maintain the one or more row units of the agricultural seeding implement off of the surface of the field as the agricultural seeding implement turns in the headlands portions of the field, a calibration check to determine whether one or more load cell sensors are calibrated, wherein the one or more load cell sensors are configured to generate signals indicative of respective measured values of a downforce applied by the one or more row units to the field.

13. The method of claim 12, comprising performing, via one or more processors, the calibration check for the one or more load cell sensors during each turn of the agricultural seeding implement in the headlands portions of the field during seeding operations for the field.

14. The method of claim 12, wherein performing the calibration check for the one or more load cell sensors comprises performing the calibration check without stopping the agricultural seeding implement.

15. The method of claim 12, wherein performing the calibration check for the one or more load cell sensors comprises:

comparing the respective measured values to an acceptable threshold range; and recording an event for a first load cell sensor of the one or more load cell sensors in response to the respective measured value for the first load cell sensor being outside of the acceptable threshold range.

16. The method of claim 15, wherein performing the calibration check for the one or more load cell sensors comprises:

excluding initial portions of the signals generated by the one or more load cell sensors during a first time period after controlling the downforce actuator or the lift actuator to lift the one or more row units of the agricultural seeding implement off of the surface of the field; and determining, based on other portions of the signals generated by the one or more load cell sensors during a second time period after controlling the downforce actuator or the lift actuator to lift the one or more row units of the agricultural seeding implement off of the surface of the field, the respective measured values for the one or more load cell sensors, wherein the second time period is after the first time period.

17. The method of claim 15, wherein performing the calibration check for the one or more load cell sensors comprises:

calculating a total number of events for the first load cell sensor in response to recording the event;

comparing the total number of events to an event threshold; and providing an alarm in response to the total number of events meeting or exceeding the event threshold.

18. The method of claim 12, wherein performing the calibration check for the one or more load cell sensors comprises filtering the signals to remove noise caused by movement of the agricultural seeding implement as the agricultural seeding implement turns in the headlands portions of the field.

19. The method of claim 12, wherein controlling the downforce actuator to drive the one or more row units of the agricultural seeding implement toward the surface of the field comprises controlling the downforce actuator to maintain the downforce within a desired downforce range.

20. An agricultural seeding implement, comprising:

a toolbar comprising a toolbar frame supported on wheels and configured to couple to a work vehicle or to an air cart;

a rockshaft rotatably coupled to the toolbar frame;

a group of row units supported on the rockshaft;

a downforce actuator coupled to the toolbar and the rockshaft, wherein the downforce actuator is configured to adjust a downforce applied by the group of row units to a field; and a controller configured to:

while the agricultural seeding implement is in a lowered position work state in which the group of row units is in a first position relative to the toolbar to place the group of row units in contact with a surface of the field, provide control signals to the downforce actuator to drive the group of row units toward the surface of the field; and in response to the agricultural seeding implement transitioning from the lowered position work state to a raised position work state in which the group of row units is in a second position relative to the toolbar and is raised off of the surface of the field, and while the agricultural seeding implement is in the raised position work state in which the group of row units is in the second position relative to the toolbar and is raised off of the surface of the field, perform a calibration check comprising a comparison of respective downforce values measured by one or more load cell sensors to an acceptable threshold range to determine whether the one or more load cell sensors are calibrated to facilitate application of a desired downforce by the group of row units to the field during seeding operations.

\* \* \* \* \*